(12) United States Patent
Fishman

(10) Patent No.: US 7,490,581 B2
(45) Date of Patent: Feb. 17, 2009

(54) FLOW CONTROL THERMOSTAT FOR INTERNAL COMBUSTION ENGINES AND METHOD OF USE OF SAME

(76) Inventor: Joseph Fishman, 99 Harbor St., Toronto (CA)

( * ) Notice: Subject to any disclaimer, the term of this patent is extended or adjusted under 35 U.S.C. 154(b) by 0 days.

(21) Appl. No.: 11/603,500

(22) Filed: Nov. 22, 2006

(65) Prior Publication Data

US 2007/0290056 A1    Dec. 20, 2007

Related U.S. Application Data

(63) Continuation-in-part of application No. 11/471,447, filed on Jun. 20, 2006, now abandoned.

(51) Int. Cl.
*F01P 7/14*    (2006.01)
(52) U.S. Cl. ..................... 123/41.1; 236/34.5
(58) Field of Classification Search ............. 123/41.09, 123/41.08, 41.1; 236/34.5, 101 C, 93 A
See application file for complete search history.

(56) References Cited

U.S. PATENT DOCUMENTS

| | | | | |
|---|---|---|---|---|
| 3,498,537 A | * | 3/1970 | Wong | ............... 236/34 |
| 4,245,782 A | * | 1/1981 | Brown | ............... 236/34.5 |
| 4,883,225 A | * | 11/1989 | Kitchens | ............... 236/34.5 |
| 5,294,046 A | | 3/1994 | Fishman | |
| 5,361,980 A | * | 11/1994 | Stout | ............... 236/34.5 |
| 5,381,952 A | * | 1/1995 | Duprez | ............... 236/34.5 |
| 5,381,953 A | | 1/1995 | Fishman | |
| 6,595,165 B2 | | 7/2003 | Fishman et al. | |
| 6,598,565 B2 | | 7/2003 | Fishman et al. | |

* cited by examiner

*Primary Examiner*—Stephen K Cronin
*Assistant Examiner*—Hyder Ali
(74) *Attorney, Agent, or Firm*—Hoffmann & Baron, LLP

(57) ABSTRACT

A thermostat for an internal combustion engine. The thermostat includes a tube type bypass valve member; a spring to keep said valve member in a closed position and a temperature sensitive actuator to move said valve member to an open position. A flow control element is provided to control a flow of fluid past said valve member as said valve member opens to prevent a sudden cooling of the engine after the engine has already reached an initial warm condition. In one embodiment a safety catch is also provided to prevent the valve from closing even if an over-temperature event damages it.

29 Claims, 6 Drawing Sheets

FLOW CONTROL THERMOSTAT FOR INTERNAL COMBUSTION ENGINES AND METHOD OF USE OF SAME

This application is a continuation-in-part of application Ser. No. 11/471,447 filed on Jun. 20, 2006 now abandoned.

FIELD OF THE INVENTION

This invention relates generally to the field of thermostats and more particularly to thermostats of the type used in liquid cooling systems for internal combustion engines. Most particularly, this invention relates to mechanically controlled temperature activated thermostats used to control the flow of coolant through a heat exchanger like a radiator and to methods of use of such thermostats.

BACKGROUND OF THE INVENTION

A thermostat is a temperature activated valve used in internal combustion engines to regulate the flow of liquid coolant. When the thermostat valve is closed, the flow of liquid coolant is prevented from being circulated through a heat exchanger such as a radiator and so the engine is allowed to quickly heat up to its optimum or design operating temperature. The engine recirculation circuit is typically restricted to a small volume of fluid compared to the overall or total volume of the cooling system. When the thermostat valve is opened, coolant from the larger cold volume is permitted into the smaller volume engine recirculating system and passes through the cylinder head where it gets hot. It is then circulated from the engine into a radiator or other heat exchanger where it loses the heat to the air flowing through the radiator. The cooled fluid is then led back to the engine where it can be used to remove further heat from the engine, recirculated to the radiator and so on. A pump driven from the engine propels the coolant around the system.

This type of thermostat valve typically operates mechanically. Most commonly, a wax pellet is provided inside a sealed chamber. The wax is solid at low temperatures, but as the engine heats up the wax melts and expands. As the wax expands, it pushes an actuator rod outwardly from the chamber that in turn opens the valve. By altering the composition of the wax, the temperature at which the valve opens can be controlled. Typically, such a thermostat valves operate generally in the range of 60° C. to 100° C. and in certain cases may run cooler or even hotter.

To reduce emissions and pollution, modern engines are designed to run hotter than before, typically over 80° C. and even higher. This permits the engine to operate more efficiently as well. However, a higher operating temperature for the engine creates certain problems for the cooling system in general and the thermostat in particular. In particular, mechanical thermostats are mass-produced as economically as possible. They typically include a stabilizing spring to position the valve components away from the base. This is desirable, because the connection is flexible and will not fatigue and fail like a rigid or fixed joint. When such a device is closed, the parts are anchored somewhat by the contact between the valve and the valve seat. However, when the valve is lifted off the valve seat as the valve opens, then the components that are flexibly attached are freeer to move, leading to vibration and chatter of the valve due to engine vibration and the like. This results in an uncontrolled gap opening between the valve and the valve seat meaning an uncontrolled flow of coolant from the cold side to the warm side through the valve.

Once the valve opens, there is a rush of cold coolant that floods the engine cooling system and creates a dramatic temperature drop that is hard on the engine components, because of such a flexible or resilient joint. The cold fluid tends to rush in because the thermostat valves are operating in a boisterous environment. The pressures in the cooling system can be large forcing the flow somewhat. The engine itself is typically vibrating and shaking, leading to chatter of the valve as it opens. The valve can be knocked askew by the fluid movement, resulting in a larger opening than intended for that temperature. As a result the thermostat permits large and sudden flows of cold fluid into the engine block when the valve first opens.

Cold fluid in a hot engine is problematic. For example, this initial drastic change of temperature has been known to cause head gasket failure in certain vehicles. Essentially, the engine heats up quickly as compared to the rest of the system and then the thermostat opens. This permits a sudden, and given the relative volumes a rather sustained rush of cold fluid to enter the head causing a temperature shock to the engine components. This problem is most acute in colder climates on initial start-up, when the coolant outside of the engine recirculation circuit may be at a very low temperature as compared to the engine temperature, due to very cold ambient conditions.

In addition to being hard on the engine components, such a sudden rush of cold fluid can drastically reduce efficiency and performance of the engine during the duration of the cold flow. As a result, a sudden plume of pollution temporarily surges from the tailpipe or exhaust until the engine and coolant system attain an optimum balance. However, it can take some time for the heat of the engine to warm the larger volume of cold cooling liquid and until it does so the engine is being over cooled and is both inefficient and polluting.

The problem identified therefore is this sudden rush of coolant into the hot running engine of the vehicle as the valve first opens. One way to address this problem is to have an electronically controlled thermostat, where the degree of opening up thermostat, and thus volume of fluid flow can be precisely controlled. However, such thermostats are extremely expensive and not suitable for most mass production OEM type applications. Another alternative is to try to vary the composition of the wax pellet to cause differential displacement of the piston over the temperature activation range. However, this also is extremely difficult to attain in practice because the expansion of mixed composition wax is not easy to implement or control. It is very difficult, if not impossible to control the rate of opening between the open and closed positions through wax composition changes alone.

What is needed is a simple and efficient method for controlling the initial inflow of liquid coolant into a hot engine through a mechanically actuated thermostat valve as the valve opens. What is also desired is a simple and efficient structure and method, in such a flow controlled thermostat, of ensuring that the thermostat fails in an open or safe position, in the event of an overheating event.

SUMMARY OF THE INVENTION

The present invention provides a simple and easy solution to the problem of the sudden rush of liquid coolant into a hot engine as discussed above. In particular, this invention relates to thermostats having tube style valve members that provide a thermostat having an initial or a cold position, in which the valve is closed to the coolant line coming from the radiator. The valve, a tube type valve member, permits generally axial flow through a short and small volume engine recirculation cooling fluid circuit while simultaneously preventing transverse flow from the larger volume radiator cooling circuit. Once the engine temperature is reached, the tube type valve opens and permits a gradual and controlled introduction of the cold side coolant fluids through the valve into the engine.

The present invention provides a way of configuring the mechanical valve elements to control the initial flow of fluid through the opening of the valve in a way that permits the engine designer to moderate the thermal shock of cold liquid coolant entering an engine at running temperatures. By controlling the flow rates over the initial opening sequence, the present invention permits a gradual introduction of coolant fluid into the engine block, thereby mitigating both thermal shock and the pollution plume.

Therefore, according to a first aspect of the present invention there is a provided a thermostat for an internal combustion engine, the thermostat comprising:

a tube type bypass valve member;

a means to bias said valve member to a closed position;

a temperature sensitive actuator to move said valve member to an open position against said biasing means; and a flow control element to control a flow of fluid past said valve member as said valve member opens.

According to another aspect of the present invention there is provided a method of controlling a flow of fluid through a thermally activated mechanical thermostat in a vehicle cooling system comprising the steps of:

providing a tube type valve member having an open top and bottom and a continuous side;

providing a flow control member adjacent to said valve member; and shaping said flow control element to control a flow of fluid past said valve member as said valve member opens.

According to another aspect of the invention there is provided an embodiment with a fail open safety catch to ensure that upon an overheating situation arising in the coolant, the thermostat will be locked in an open position to prevent a failure of the mechanical elements of the thermostat from causing the thermostat to close when it should be open.

BRIEF DESCRIPTION OF THE DRAWINGS

Reference will now be made to preferred embodiments of the present invention by way of example only as shown in the attached figures.

DETAILED DESCRIPTION OF THE PREFERRED EMBODIMENTS

Figure 1:
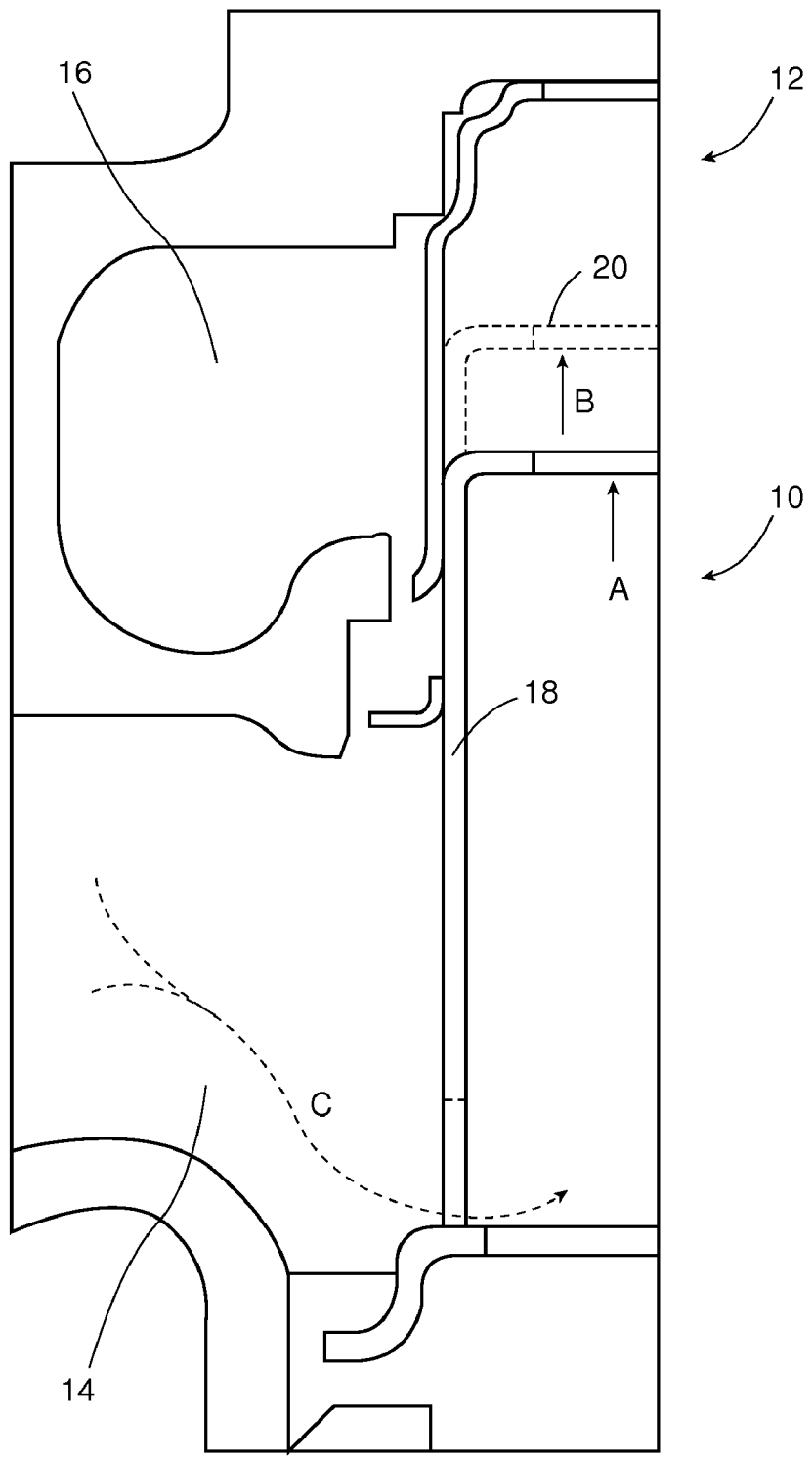
FIG. 1 is an example of a prior art tube type valve design.

FIG. 1 shows a prior art thermostatic valve 10 in an engine environment 12. A passageway 14 is connected to the radiator or heat exchanger. A passageway 16 is a short recirculation passageway in the engine itself through which the coolant flows when the thermostat valve 10 is closed as shown in solid outline in FIG. 1. The thermostat valve 10 includes a tube-like valve member 18 which allows coolant to circulate in the direction of arrow A up through the valve and into the engine recirculation coolant passageway 16. Upon the engine warming to the design operating temperature, a thermally activated actuator (not shown) opens the valve 18 in the direction of arrow B to position 20. At this point, large volumes of coolant indicated by arrow C pass through the valve and change the temperature of the engine. As discussed above, for the first six or seven minutes the cold coolant creates a thermal shock within the engine until the engine has sufficiently warmed the cold liquid coolant in the entire coolant system closer to design operating temperatures.

Figure 2:
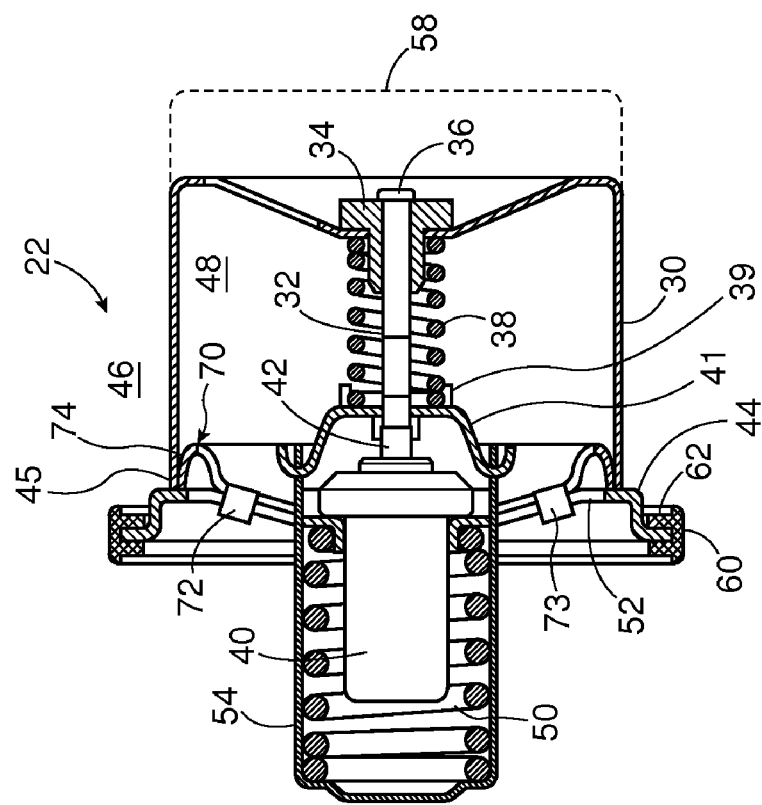
FIG. 2 is a view of an embodiment of the present invention in the fully closed position.

FIG. 2 shows a cross-section through an embodiment of the present invention indicated as 22. FIG. 2 shows a tube type valve member 30, similar in form to the valve member 18 of FIG. 1. The valve member 30 is attached to a central post 32 by means of a bushing 34 held in place by threaded end cap 36. A stabilizing spring 38 locates and stabilizes the bushing 34 and the valve member 30 at the end of the central post 32. The height of the post 32 is adjustable by means of the threaded end cap 36. A collar 39 is provided on a moving valve frame 41 to center the stabilizing spring 38 on the post 32. A thermo-mechanical actuator 40 is located at an end of the post 32 opposite to said valve member 30 and contains a sealed chamber having a thermally expanding material such as wax. The wax, when heated melts, expands and extends an actuator piston 42 outwardly. The piston 42 is aligned with post 32, and moves the entire post 32, valve member 30 and stabilizer spring 38 assembly upwardly. As the valve member 30 is moved upwardly, it is raised off valve seat 44 and begins to permit fluid from the cold side 46 pass into the hot side 48.

A spring or a biasing element 50 is located between an underside of a stationary valve frame 52 and a moving spring housing 54. The biasing element 50 urges the valve member 30 to a closed position which position is maintained unless the temperature rises sufficiently to cause the thermally expanding wax to expand thereby extending the valve 30 to the position in dotted outline 58 in FIG. 2. A rubber gasket 60 is attached to an end of a flange 62 of the valve frame 52 which extends outwardly from the thermal-mechanical actuator as shown. The gasket 60 permits the stationary valve frame 52 to be clamped in place within the engine cooling system in a conventional manner.

Figure 3:
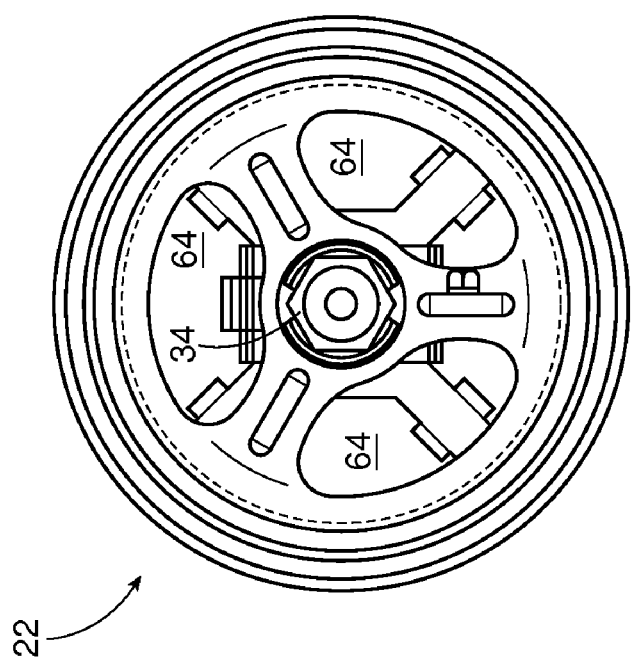
FIG. 3 is a view from above of FIG. 2.

FIG. 3 shows a top view of the valve of FIG. 2, showing the bushing 34 and openings 64 through which coolant may pass, and which is why the valve member 30 is characterized as a tube type valve member. Basically it has an open top and bottom to permit flow but continuous sides, to block flow.

According to the present invention, the thermostat 22 also includes a flow control element 70 (FIG. 2) to control the flow as the valve member 30 first opens. The flow control element 70 includes tabs 72, 73 that are bent around the stationary valve frame 52 to retain the flow control element 70 in place. In this way the flow control element 70 can be specifically configured for particular operating environments and secured in position on a standard base 52. Thus, the present invention provides a simple and easy to incorporate element 70 for existing thermostatic valve. It will be understood by those skilled in the art that while the embodiment shown is held in place by bent tabs, many other ways of securing the flow control element 70 to the frame 52 are comprehended including welding or the like.

The preferred embodiment shows a separate flow control element that is secured onto an existing flange member of a stationary frame of the thermostat. The present invention also comprehends that the flow control element could be integrally formed as part of the stationary frame without departing from the scope of the invention, such as by machining or the like the flow control surface directly out of the stationary frame. In this case although there is no separately attached flow control element, the part of the stationary frame which provides the flow control surface will be equivalent to the flow control element of the present invention. The use of a separate drawn element as shown is believed preferred for cost and ease of manufacture but the invention is not limited thereto. Any structure having a flow control surface will be considered to be within the invention whether by means of two elements or more or fewer elements.

As can be seen the flow control element 70 includes a flow control surface 74 that diverges from the valve seat 44 onto which a bottom edge 45 of the tube type valve element is seated in a closed position. As the temperature of the coolant rises and the actuator begins to extend the central post 32, the lower edge 45 of the tube like valve element 30 is displaced upwardly from the valve seat 44. As can now be appreciated the shape of the flow control surface 74 permits the volume of the flow to be controlled. The amount of divergence between the surface 74 and lower edge of the tube like valve element can be controlled to permit a predefined amount of coolant fluid to pass through the gap at any point in the outward stoke of the actuator.

Figure 4:
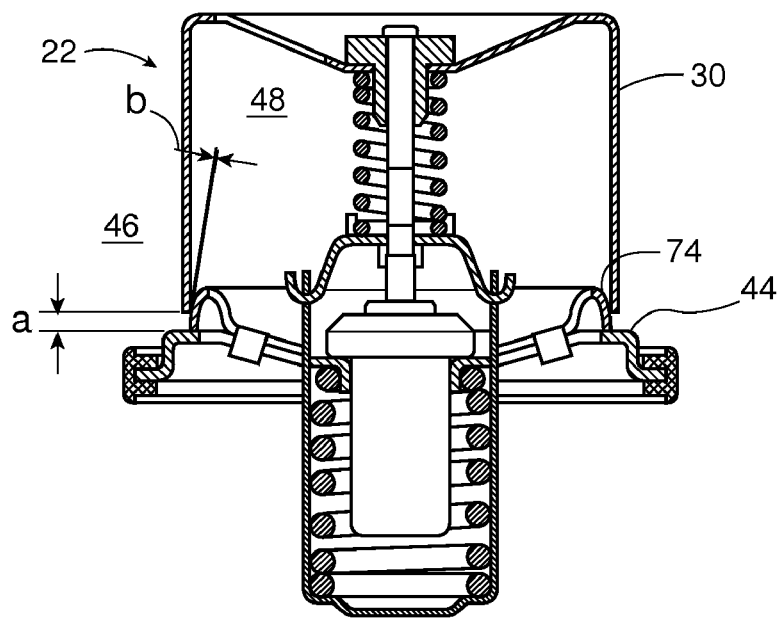
FIG. 4 is a view of the embodiment of FIG. 2 in a partially open position.

FIG. 4 shows the embodiment of FIG. 3 as the actuator begins to lift the tube type valve member 30 off the seat 44. As can be seen the stroke of the piston and so the gap between the bottom edge of the valve and the valve seat is a distance a, and yet the opening or gap between the bottom edge of the valve and the flow control surface is distance b. The distance b can be any desired amount as explained below, but will be less than the distance a. The distance b will determine how much cooling fluid will pass into the warm side from the cold side. By changing the shape of the surface 74 the amount of coolant passing from the cold side 46 to the warm side 48 can be varied and controlled at each point of the stroke of the thermally activated actuator. In this manner the flow through the valve 22 can be tailored to suit the specific engine being cooled.

Figure 5:
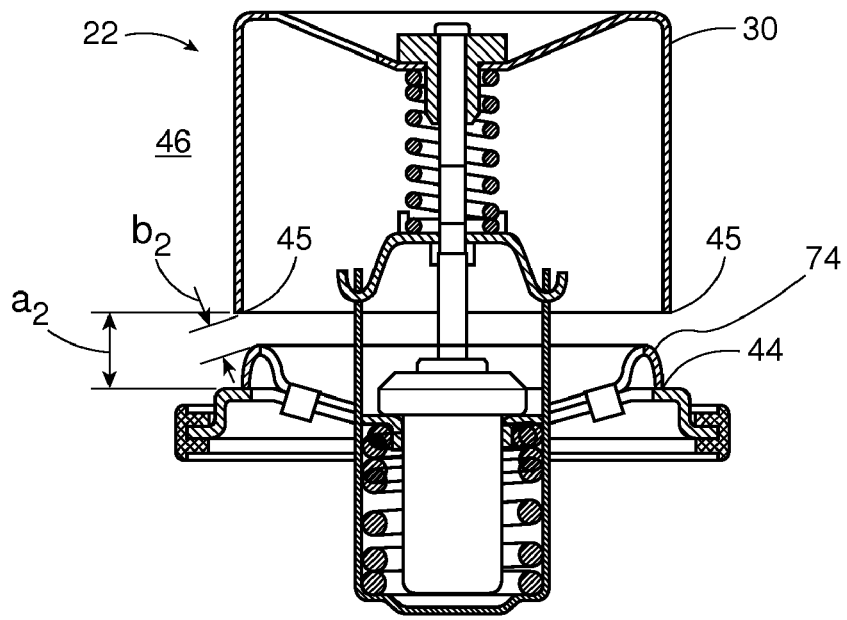
FIG. 5 is a view of the embodiment of FIGS. 2 and 3 in a fully open position.

FIG. 5 shows the embodiment of FIG. 4 with the coolant at a higher temperature and hence with a greater displacement of the valve element 30 by the actuator off the valve seat 44. In this Figure the stroke length is shown as distance a2 and the gap between the flow control surface 74 and the valve element 30 is shown as a distance b2. It can be seen that b2 is less than a2. Thus, even at this amount of displacement of the valve element 30 the amount of fluid passing from the cold side 46 to the warm side 48 is restricted as compared to the prior art device of FIG. 1. Eventually of course the displacement of the valve element 30 is so great that the full amount of fluid capable of passing through the valve opening begins to pass through and further displacement of the valve element 30 has no further bearing on the flow through volume. Depending upon the circumstances this may or not be reached before the end of the piston stroke when the engine is operating at design running temperatures.

It can now be understood that a more steeply sloped and higher flow control surface 74 restricts more coolant flow and for longer. Conversely, a less steeply sloped and shorter flow control surface will permit more coolant to flow more quickly. By altering the shape and the height of the flow control surface 74 adjacent to the bottom 45 of the tube like valve element 30, the initial flow rates of cold side fluid 46 into the warm engine side 48 upon the thermostat valve opening can be carefully controlled. In this manner, the present invention provides a simple and effective means for preventing a sudden surge of cold coolant into the heated engine upon the thermostat first opening.

Figure 6:
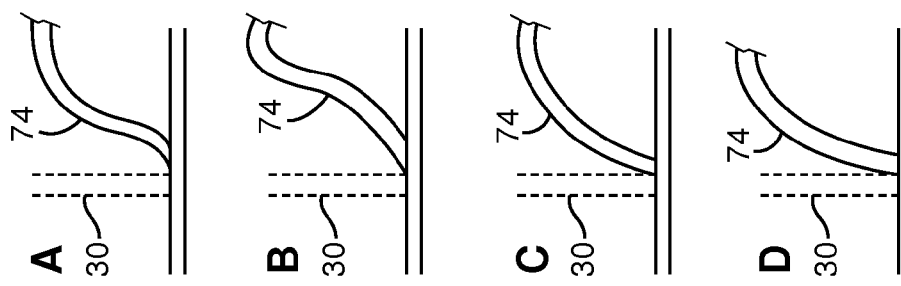
FIG. 6 is a view of alternative profiles for the present invention.
Figure 7:
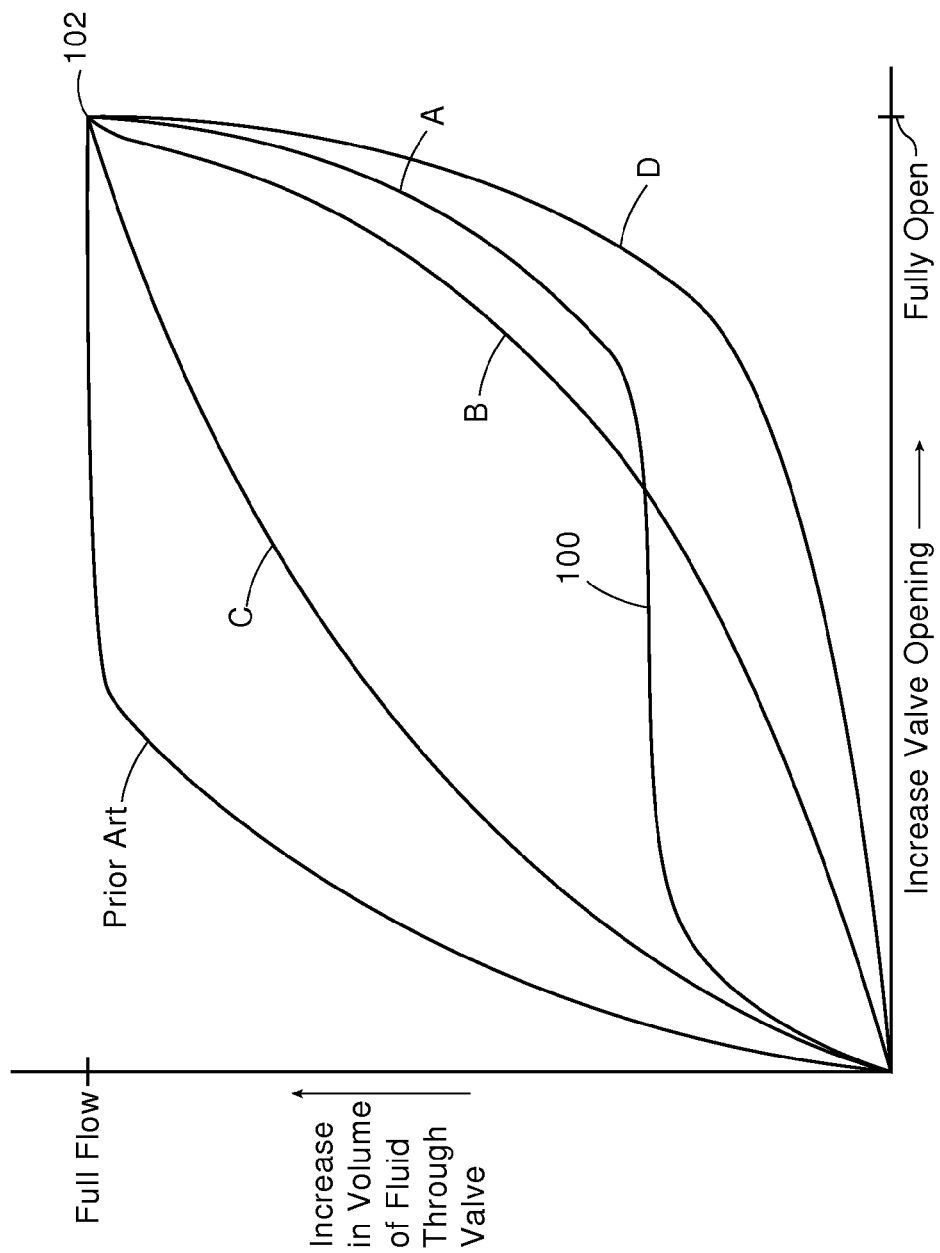
FIG. 7 is a graph illustrating the effect on fluid flow volume of the profiles of FIG. 6.

FIG. 6 shows four different sample profiles for the flow control surface 74 according to the present invention, shown as A, B, C and D. In each case, the valve element is shown in dashed outline for reference. FIG. 7 is a schematic plot of stroke displacement against volume of fluid flow, with the points of maximum stroke and maximum flow being marked. The prior art flow pattern, which arises from the configuration of FIG. 1, is labelled as well as the flow patterns for the profiles A, B, C, and D. As shown the profile A results in a quick rise in flow volume to a level at 100, which remains somewhat constant until it again rises quite quickly to full flow at 102. The profile B shows a slow rise at first with a steeper rise towards full flow at 102. The profile C shows a quicker rise in flow than profile B at first, but a more gradual rise at the end of the stroke. The profile D shows a very slow rise in the flow volume for the first part of the stroke, followed by a rapid rise in volume at the end.

While the foregoing examples show particular embodiments it will be understood that many shapes of flow control surface are comprehended by the present invention. It can now be appreciated that the present invention comprehends flow control surfaces that include complex curves, as well as primarily concave and convex curved surfaces. The flow control surface can also be made planar, stepped or any other shape that is desired to provide a particular flow profile over the initial stroke of the thermally activated actuator. The profiles A, B, C and D are examples only, and many other shapes are comprehended by the present invention. What is believed important is to provide a flow control surface 74, which is sized, shaped and positioned to permit the initial flow of cold fluid from the cold side to be controlled to permit a more gradual and gentle introduction of the cold fluid into the engine than was possible in the prior art tube style mechanical thermostats.

Figure 8:
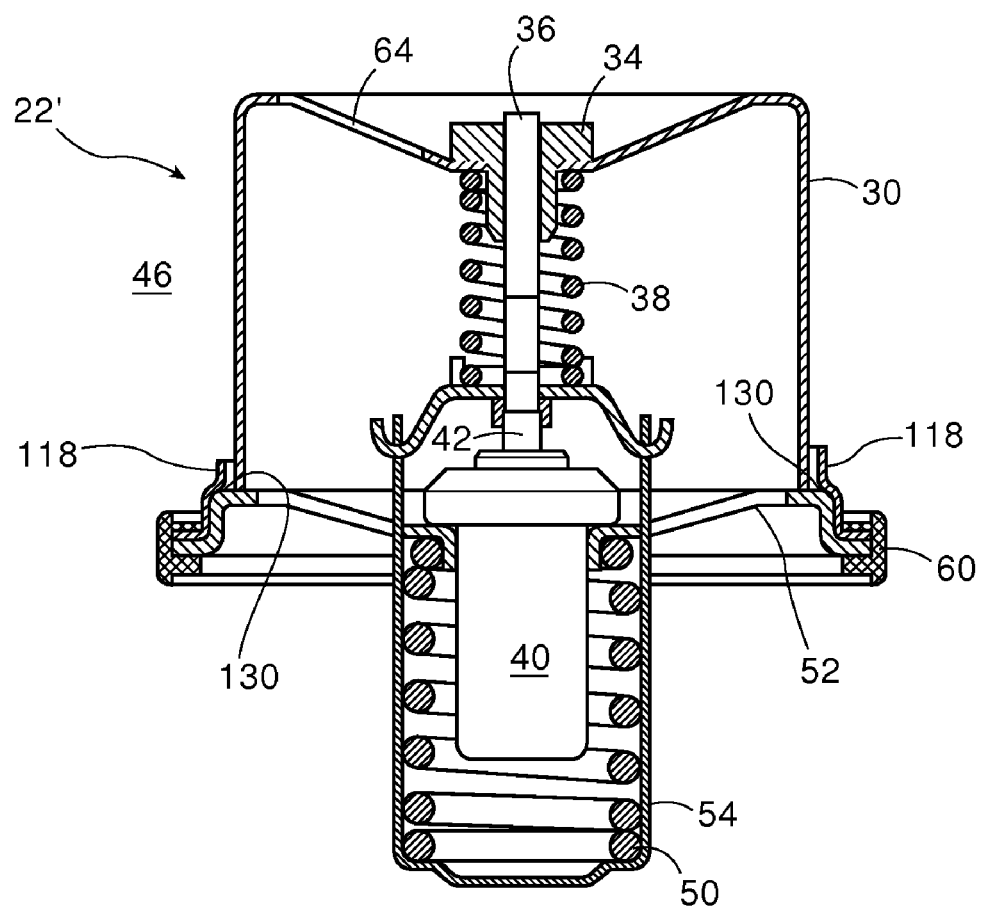
FIG. 8 is a further embodiment of the present invention.

FIG. 8 shows another embodiment of the present invention in which a flow control element 118 is placed on the cold side 46 of the tube type valve member 30. In this case the flow control element 118 is incorporated into the rubber gasket 60 and will be held in place by the same clamping action that holds the stationary frame 52 of the valve 22' in place. The flow control surface 130 is defined as the surface between the bottom of the valve element 45 and the flow control element 118. In FIG. 8 the flow control element 118 is generally parallel to the side of the valve in cross section. This shape will permit a constant, but modest volume of flow for the first part of the stroke of the actuator, and after that when the valve bottom passes past the top of the element, the gap will open up quite quickly to permit full flow. Again, while a generally straight, in cross section profile is shown, the present invention comprehends any profile as may be suitable for providing a more controlled and preferred introduction of cold fluid into the warm side of the cooling system on initial valve opening.

While the cold side positioning of this embodiment is suitable for some applications the warm side positioning of the flow control element of FIG. 3 is preferred because there is usually physically more space on the warm side than on the cold side in most circumstances.

Another aspect of the flow control surface can now be appreciated. In the boisterous environment of an engine, the flow control surface also acts as a guide for the valve element to prevent excess displacement, for example by being knocked too far askew by vibrations or fluid pressure. The flow control surface can help to restrict displacement of the valve member as it is being lifted off the valve seat 44 during the warming stage and can help to guide the element back down safely onto the valve seat 44 on the cooling down phase. Thus the present invention also provides for sizing and shaping the flow control element to act as a guide means to guide valve element back onto the valve seat 44.

The present invention permits control over the amount or rate of cold fluid being introduced into the engine. Thus, the engine can be kept running hotter sooner than in the prior art, increasing both the efficiency and reducing initial pollution problems. Even though the same amount of coolant is to be heated, the present invention provides for a warm engine at least 20% faster than is possible with the prior art, and perhaps even better than 20% in some cases.

Figure 9:
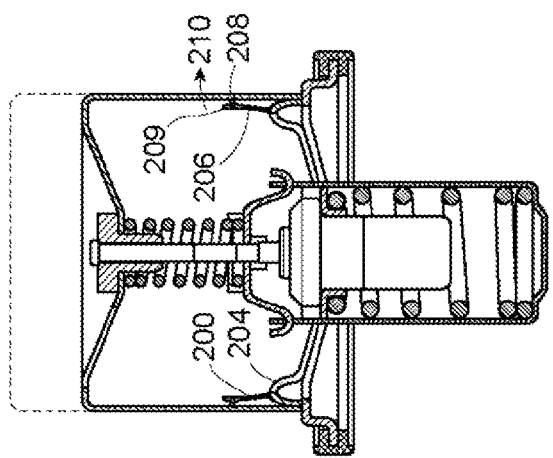
FIG. 9 is further embodiment of the present invention with a fail-safe feature incorporated into the flow control element.

FIG. 9 shows a further embodiment of the present invention that includes a fail-safe feature built into the flow control element. As will be understood by those skilled in the art, under extreme conditions the engine can overheat. This might occur, if there is a loss of motor oil lubricant, or if for some reason the radiator stops functioning. In such cases the temperatures in the engine and the cooling system can rise far above the design specifications and if sustained for long enough can cause irreversible damage to the flow control thermostat. For example, the components of the temperature sensitive actuator may fail, allowing the thermally expanding material to leak from the closed chamber, or the temperature may get high enough to even alter the temperature sensitive material properties of the thermally expanding material.

Such an extreme temperature situation might be chronic, or transient, but can damage the thermostat if high enough temperatures are reached. Once a damage threshold is passed, the result could be that the actuator losses its ability to extend against the spring, leading to the valve actually closing, in the overheated situation. As can well be appreciated closing the valve in an already overheated engine condition will do nothing but aggravate the problem and likely contribute to permanent engine damage. Even if the source of the temperature problem is fixed before permanent engine damage is permitted to occur, the temperature sensitivity of the actuator might be compromised and it can become non-functional meaning that it never opens and the desired engine cooling will not occur.

The embodiment of FIGS. 9 to 12 of the present invention provides a fail-safe feature to ensure that even if the expansion material of the thermostat is damaged, the valve will stay open. As shown in FIG. 9 this is accomplished by means of safety catch arms 200 that are formed in the flow control element 204 itself. While the arms 200 can be separately formed, or formed integral with other components of the assembly, making them part of the flow control element is convenient and has rendered reasonable results. The, safety catch arms 200 include an upwardly extending portion or finger 206, which ends in a catch or stop 208 with a brace 209. Ideally the arms 200 are biased in an outwardly direction 210, by the inherent resiliency of the material from which they are formed.

The preferred form of the invention is to use four fingers 206, although more of fewer can also be used. The minimum number of fingers 206 that is comprehended is one, although two or more are preferred to provide more symmetrical support of the valve element when required. It is believed that optimum results are achieved with four fingers 206 as shown (in FIG. 12). If only one finger is used, care must be taken to ensure that the valve element does not slip off the safety catch 208 unintended.

Figure 11:
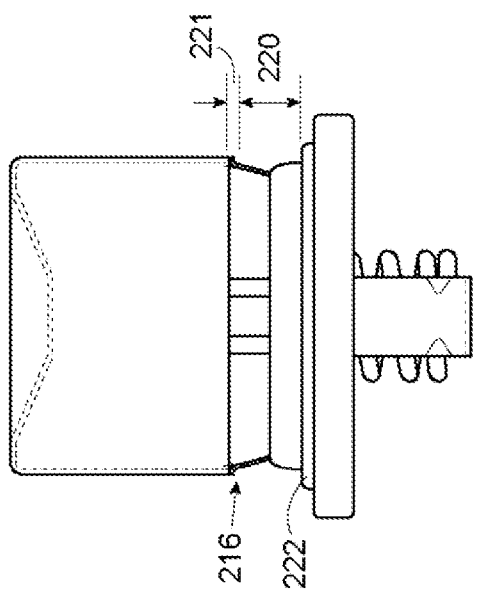
FIG. 11 is an exterior view of the embodiment of FIG. 10.
Figure 10:
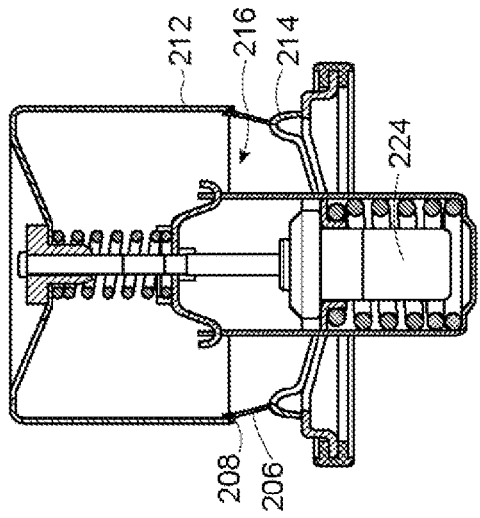
FIG. 10 is a cross-sectional view of the embodiment of FIG. 9 with the fail-safe feature engaged.

The operation of the present embodiment can now be understood with reference to FIGS. 10 and 11. As the temperature rises, the valve member 212 lifts off the valve seat and the flow control surface 214 limits the coolant flow 216 during the initial phases of the movement of the valve member. As the temperature continues to rise, the valve member 212 continues also to rise and it climbs up towards the ends of the fingers 206, where the stops 208 are located. According to this embodiment of the invention the end 216 of the safety catch finger is positioned at a location corresponding to an over temperature of the engine, but below the level at which damage to the thermostat is likely to occur. This temperature, and position, is outside of the normal operating range for the engine and so would not be encountered in normal operation. The double-ended arrow 220 notes the normal operating range of the actuator and 221 indicates the over-temperature range.

However, if there is an overheat situation then the valve will, at least initially and until such time as the actuator actually fails, be extended beyond the ends of the safety catches 208. Due to the inherent tendency of the safety catches to bend outwardly, the stops 208 become engaged with an underside of the valve element 212, and the brace arms 209 support against the inside of the valve 212 and this prevents the valve element from returning back to the valve seat 222. In this way, even if the temperature continues to rise, and the temperature sensitive actuator 224 fails, the valve 212 will not be permitted to return to the valve seat 222, ensuring the full cooling of the engine during and even after the high temperature episode. It will be appreciated that the brace arms 209 need to be long enough to capture the valve during the range of overheat motion 221 and are most preferred to extend beyond such a range to ensure that the valve never climbs over the same. What is comprehended is that the extension above the stop or locking surface will be long enough to prevent the valve 212 from climbing over the end and thus possibly coming off the stop catch 208. The fact that the valve 212 is now permanently propped open can now be detected from the operation of the vehicle, visual inspection or the like and the thermostat changed in servicing the engine.

It will be appreciated by those skilled in the art that the position of the stop 208 on the arm 202 can be varied somewhat depending upon the characteristics of the engine in which the invention is placed. What is comprehended is a location that, on the one hand is outside of the normal reach of the valve during the design operational temperature range of the engine coolant, but on the other hand is not so far out of range as to be likely not to be reached due to damage to the thermostat. Thus, while at the upper temperature range of the functionality of the thermostat the position should still be within a range that the actuator can reach before being damaged. In other words, it is preferred to locate the stop at or below the maximum throw or range of motion of the valve.

Figure 12:
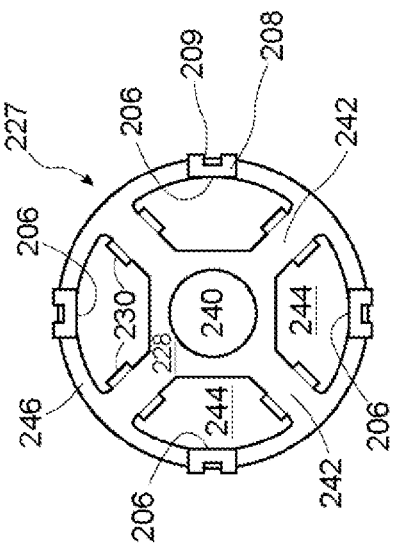
FIG. 12 is a top view an adjunct element for providing the flow control to the embodiments of FIGS. 9 to 11.

As can now be appreciated this embodiment provides an easy to fabricate fail safe locking element which can be made integral with the flow control surface features, by simply striking out and bending the safety catch arms around the perimeter of an adjunct element 227. In this way, one or functions namely flow control and fail-safe locking can be provided by means of a simple adjunct element 227 that can be attached onto the base of an existing valve design. As in the previous embodiment the adjunct element has a body 228 including the securing tabs 230, shown in FIG. 12, to secure the device to the arms of an existing valve assembly. FIG. 12 also shows the fingers 206, the stops 208, the brace arms 209, a central opening 240 for the body of the actuator and the bridges 242 which correspond to the arms of the base 213 for the valve 212. The openings 244 are the flow openings for the coolant liquid and, although the curved surface is not visible in this view, the flow control surface is provided around the perimeter at 246.

While reference has been made to preferred embodiments of the invention those skilled in the art will understand that they are provided by way of example only and that various modifications and alterations may be made that do not depart from the broad scope of the claims as attached. For example while various flow control surface profiles are shown other can be made according to suit the individual operating characteristics of a particular engine.

The embodiments of the invention in which an exclusive property or privilege is claimed are defined as follows:

1. An immersion type thermostat for a fluid coolant system of an internal combustion engine, said engine including a heat exchanger and a recirculation cooling circuit, said thermostat comprising:
   a tube type valve member having an open top and bottom, and a continuous side;
   a valve seat located to engage said valve member;
   means to bias said valve member to a closed position against said valve seat to prevent transverse flow of coolant into said thermostat;
   a temperature sensitive actuator to move said valve member to an open position off said valve seat and to thereby permit transverse flow of coolant into said thermostat; and
   a flow control element associated with said valve seat to regulate the flow rate of an initial transverse flow of coolant fluid past said valve member as said valve member opens.

2. The thermostat for an internal combustion engine as claimed in claim 1, wherein the flow control element is located on a warm side of said valve member.

3. The thermostat for an internal combustion engine as claimed in claim 2, wherein said flow control element includes a flow control surface sized and shaped to control the flow rate of said initial transverse flow of coolant past the valve member in a predetermined manner as the valve member is displaced from the valve seat.

4. The thermostat for an internal combustion engine as claimed in claim 3, wherein said flow control element comprises a part convex flow control surface.

5. The thermostat for an internal combustion engine as claimed in claim 3, wherein said flow control element comprises a part concave flow control surface.

6. The thermostat for an internal combustion engine as claimed in claim 3, wherein said flow control element comprises a compound curved flow control surface.

7. The thermostat for an internal combustion engine as claimed in claim 3, wherein said flow control surface is sized, shaped and positioned to provide a gap to permit coolant flow which is less than a displacement amount of said valve off said valve seat.

8. The thermostat for an internal combustion engine as claimed in claim 3, wherein said flow control element comprises a flow control surface which is sized, shaped and positioned to define a gap between said valve member and said flow control surface, said gap being different from an amount of displacement of said valve member off said valve seat as said valve member is moved off said valve seat.

9. The thermostat for an internal combustion engine as claimed in claim 1, wherein said flow control element is secured to a stationary frame of said valve element.

10. The thermostat for an internal combustion engine as claimed in claim 9, wherein said flow control element is secured to said stationary frame by means of bent tabs.

11. The thermostat for an internal combustion engine as claimed in claim 1, wherein said flow control element is sized, shaped and positioned to guide said valve member onto and off said valve seat during an initial part of a displacement of said valve member from said valve seat.

12. The thermostat for an internal combustion engine as claimed in claim 1, further including a safety catch for locking said valve member of said thermostat in an open position in the event the internal combustion engine overheats.

13. The thermostat for an internal combustion engine as claimed in claim 12, wherein said safety catch includes at least one arm extending up from said valve member seat having a stop located at a distal end.

14. The thermostat for an internal combustion engine as claimed in claim 13, wherein said stop includes a portion transverse to the direction of travel of said valve member and a brace arm, extending above the stop, along the direction of travel of said valve member.

15. The thermostat for an internal combustion engine as claimed in claim 14, wherein said stop is located at a point of travel of said valve member that is reached when said engine is overheated, but below a temperature at which damage to said thermostat will occur.

16. The thermostat for an internal combustion engine as claimed in claim 14, wherein said stop is located just below or at a point of maximum travel of said valve member due to temperature effects on said temperature sensitive actuator.

17. The thermostat for an internal combustion engine as claimed in claim 14, wherein said arm is sized and shaped to be biased towards said valve member, wherein when said valve member travels beyond said stop, said arm engages said stop below said valve member to secure the same in an open position.

18. A method of controlling a flow of fluid through a thermally activated mechanical thermostat in a vehicle cooling system comprising the steps of:
   a. providing a tube type valve member having an open top and bottom and, a continuous side;
   b. providing a flow control member adjacent to said valve member; and
   c. shaping said flow control element to control the flow rate of an initial transverse flow of fluid past said valve member as said valve member opens.

19. The method of controlling a flow of fluid through a thermostat in a vehicle cooling system as claimed in claim 18, wherein said step of shaping said valve member comprises forming a convex curve in said flow control element.

20. The method of controlling a flow of fluid through a thermostat in a vehicle cooling system as claimed in claim 18, wherein said step of shaping said valve member comprises forming a concave curve in said flow control element.

21. The method of controlling a flow of fluid through a thermostat in a vehicle cooling system as claimed in claim 18, wherein said step of shaping said valve member comprises forming a complex curve in said flow control element.

22. The method of controlling a flow of fluid through a thermostat in a vehicle cooling system as claimed in claim 18, wherein said step of shaping said valve member comprises forming a guide for said valve when said valve is adjacent to said valve seat.

23. The method of controlling a flow of fluid through a thermostat in a vehicle cooling system as claimed in claim 18, wherein said step of shaping said valve member comprises shaping said flow control member to restrict an initial flow of fluid past said valve member as said valve member opens.

24. The method of controlling a flow of fluid through a thermostat in a vehicle cooling system as claimed in claim 18, wherein said step of controlling a fluid flow through said thermostat includes providing a safety catch and locking said thermostat in an open position in the event the cooling system overheats.

25. The method of controlling a flow of fluid through a thermostat in a vehicle cooling system as claimed in claim 24, wherein said step of providing a safety catch comprises forming said safety catch integral with said flow control member.

26. The method of controlling a flow of fluid through a thermostat in a vehicle cooling system as claimed in claim 18, wherein said step of providing a safety catch includes sizing and shaping said safety catch to bias said safety catch towards an engaging position.

27. The method of controlling a flow of fluid through a thermostat in a vehicle cooling system as claimed in claim 26, wherein said step of providing a safety catch further includes positioning said safety catch at a position outside of a normal operating range of the valve member.

28. An adjunct element for a thermostat for an internal combustion engine, the thermostat including a valve member and a valve seat, the adjunct element comprising:
   a body sized and shaped to be secured to a said valve seat of said thermostat;
   means to secure said body to said valve seat, and
   a flow control element associated with said valve seat to regulate the flow rate of an initial transverse flow of coolant fluid past said valve member as said valve member opens; and
   a safety catch for locking said valve member of said thermostat in an open position in the event the internal combustion engine overheats.

29. The adjunct element for a thermostat for an internal combustion as claimed in claim 28, wherein the means for securing said body to said valve comprises tabs bent to secure said adjunct element to said valve.

* * * * *